Figure 1:
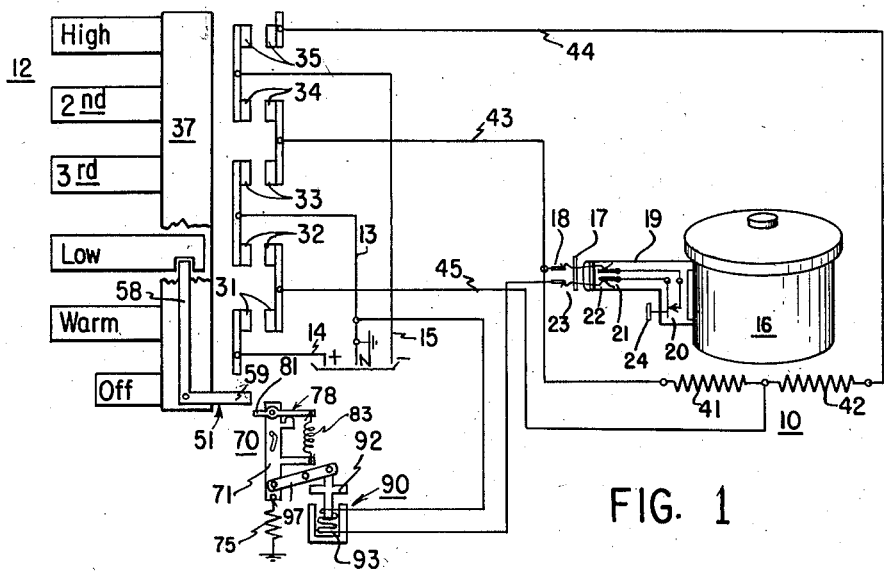

Oct. 7, 1952          R. O. WARNER          2,613,289

SWITCHING APPARATUS FOR ELECTRIC COOKING APPLIANCES

Filed Feb. 18, 1950          2 SHEETS—SHEET 1

*INVENTOR.*
Roland O. Warner
BY
*Smith, Olsen + Baird*
Attys.

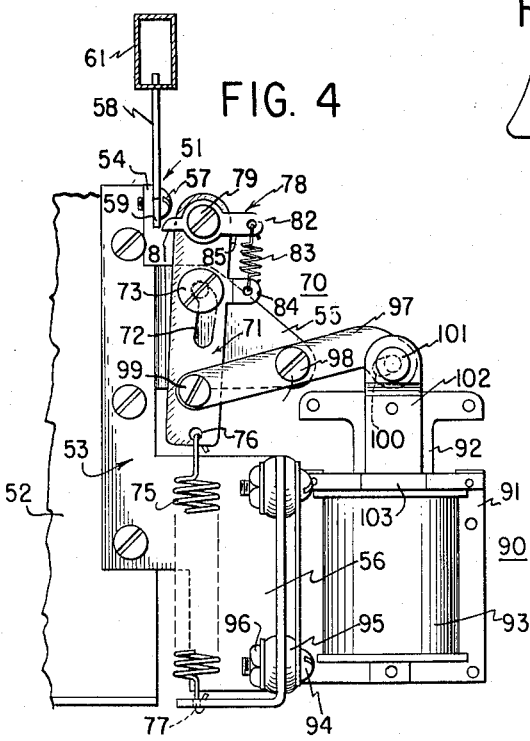
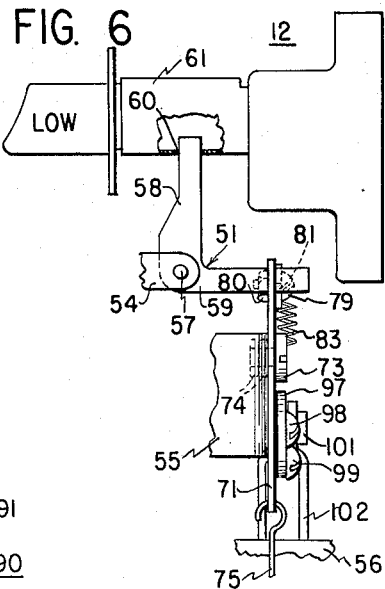
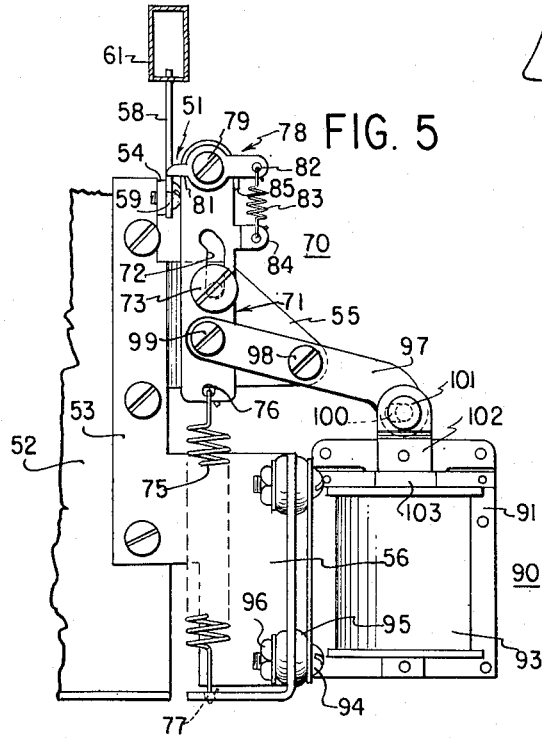
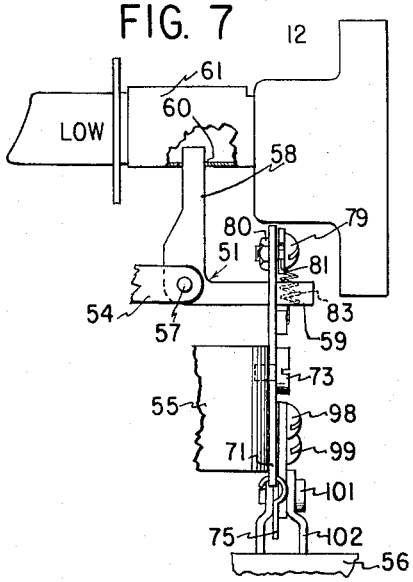

Patented Oct. 7, 1952

2,613,289

UNITED STATES PATENT OFFICE 2,613,289

SWITCHING APPARATUS FOR ELECTRIC COOKING APPLIANCES

Roland O. Warner, Chicago, Ill., assignor to Hotpoint Inc., a corporation of New York Application February 18, 1950, Serial No. 144,921

5 Claims. (Cl. 200—5)

The present invention relates to switching apparatus for electric cooking appliances, and more particularly to improved push-button switches for electric ranges of the general character of that disclosed in the copending application of Walter R. McDowell, Serial No. 56,813, filed October 27, 1948, now Patent No. 2,550,579, granted April 24, 1951.

The electric range disclosed in the McDowell application mentioned comprises a cooking top supporting a surface heating unit, and a backsplasher carrying a manually operable push-button switch. The push-button switch is of the construction of that disclosed in U. S. Patent No. 2,431,904, granted on December 2, 1947 to John L. Andrews, and embodies the selective color illuminating arrangement for the individual push buttons thereof disclosed in U. S. Patent No. 2,437,555, granted on March 9, 1948 to Gregory L. Rees. Also, the range is provided with a cooking vessel carrying a thermal switch, a source of current supply of the three-wire Edison type and a control circuit including an electromagnetic relay provided with a winding and an armature operatively connected to the low push button of the push-button switch.

In the operation of this range, food to be cooked is placed in the vessel, the vessel is placed upon the surface heating unit, the thermal switch is operatively connected into the control circuit, and the high push button of the push-button switch is manually operated. Heating of the surface heating unit at the corresponding high heating rate is thus initiated, whereby the vessel and its contents quickly reach a cooking condition, whereupon the thermal switch is operated. Operation of the thermal switch effects energization of the winding of the relay, whereby the armature thereof is operated to effect automatic operation of the low push button of the push-button switch. Heating of the surface heating unit at the corresponding low heating rate is thus continued, whereby the vessel and its contents are maintained at the cooking condition. After the food has been adequately cooked the off push button of the push-button switch is manually operated in order to arrest heating of the surface heating unit, and consequently to arrest heating of the vessel and cooking of the food contained therein.

While this range and its control arrangement are highly satisfactory in operation, the push-button switch is unbalanced by the operative connection between the low push button thereof and the armature of the relay, so that all of the push-buttons of the push-button switch do not have precisely the same feel and ease of operation, often leading the cook to the erroneous conclusion that the push-button switch is out of adjustment, or is otherwise defective. This sensation is further accentuated by the circumstance that the cooking top of this range supports other surface heating units, and the backsplasher carries other manually operable push-button switches individually associated therewith, wherein the feel and ease of operation of the individual push buttons of the other push-button switches are uniform.

Accordingly, it is a general object of the present invention to provide in an electric heating appliance, such as an electric range, including a heating control arrangement of the character noted, switching apparatus including an improved operative connection between the push-button switch and the armature of the electromagnetic relay so that each push button of the push-button switch has substantially the same feel and ease of operation.

Another object of the invention is to provide in combination manually and automatically operated switching apparatus, an improved arrangement of the elements thereof so that the manually operated elements of the switch are in no way interfered with by the automatically operated elements of the switch.

A further object of the invention is to provide combination manually and automatically operated switching apparatus of the multiposition type, that is of improved construction and arrangement and that is positive and efficient in operation under both manual and automatic control.

Further features of the invention pertain to the particular arrangement of the elements of the switching apparatus, whereby the above-outlined and additional operating features thereof are attained.

Figure 2:
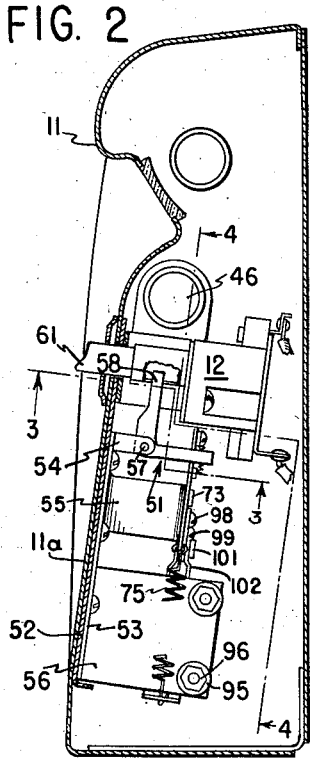
Figure 3:
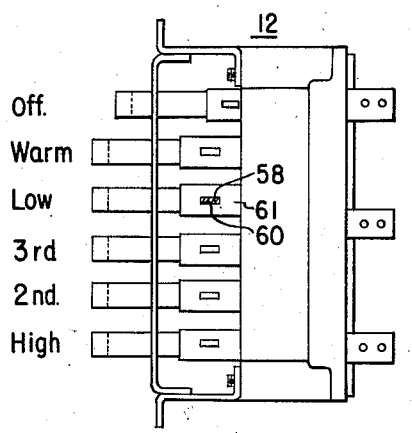

The invention, both as to its organization and method of operation, together with further objects and advantages thereof, will best be understood by reference to the following specification taken in connection with the accompanying drawings, in which Figure 1 is a diagrammatic illustration of an electric range provided with a thermostatically controlled cooking vessel and incorporating a heating control arrangement and switching apparatus embodying the present invention; Fig. 2 is a vertical sectional view taken through the hollow backsplasher of the electric range and illustrating the mounting of the switching apparatus therein; Fig. 3 is an enlarged bottom view of the switching apparatus, taken in the direction of the arrows along the line 3—3 in Fig. 2; Fig. 4 is an enlarged rear view of the switching apparatus, taken in the direction of the arrows along the line 4—4 in Fig. 2 and illustrating the electroresponsive operating motor thereof in its released position; Fig. 5 is another enlarged rear view of the switching apparatus, similar to Fig. 4, and illustrating the electroresponsive operating motor thereof in its operated position; Fig. 6 is an enlarged fragmentary side view of the switching apparatus, further illustrating the positions of certain of the parts thereof in accordance with the condition thereof as shown in Fig. 4; and Fig. 7 is another enlarged fragmentary side view of the switching apparatus, similar to Fig. 6, and further illustrating the positions of certain of the parts thereof in accordance with the condition thereof as shown in Fig. 5.

Referring now to Fig. 1 of the drawings, there is diagrammatically illustrated a portion of an electric range incorporating a heating control arrangement and switching apparatus and embodying the features of the present invention. The electric range comprises a substantially horizontally disposed cooking top, not shown, that supports a plurality of surface heating units, including the surface heating unit 10 illustrated. Also, the range comprises an upstanding hollow backsplasher 11 arranged adjacent to the rear of the cooking top and serving as a housing for the switching apparatus and other instrumentalities, as explained more fully below. Preferably, the surface heating units 10, etc., carried by the cooking top of the electric range are disposed in a geometric pattern adjacent to the left-hand side thereof, the surface heating unit 10 comprising the right rear surface heating unit and being positioned adjacent to the backsplasher 11. Further, the backsplasher 11 carries a plurality of push-button switches, including the push-button switch 12, that are respectively individually associated with the surface heating units noted, the push-button switch 12 being individually associated with the surface heating unit 10. The push-button switches 12, etc., are housed within the hollow backsplasher 11 and are operatively connected to a source of current supply of the three-wire Edison type and to the respective surface heating units 10, etc. Preferably the source of current supply is of 230 volts A. C., including a grounded neutral conductor 13 and two outside or line conductors 14 and 15. Preferably each of the push-button switches 12 is of the construction of that disclosed in U. S. Patent No. 2,431,904, granted on December 2, 1947 to John L. Andrews, and embodies the selective color illuminating arrangement for the individual push buttons thereof disclosed in U. S. Patent No. 2,437,555, granted on March 9, 1948 to Gregory L. Rees.

Finally, the electric range comprises a thermally controlled cooking vessel 16 that may be operatively connected by a selectively detachable flexible cable 17 into a connecting fixture 18 carried by the backsplasher 11 and thus into the control circuit between the surface heating unit 10 and the push-button switch 12, as described more fully hereinafter. The cooking vessel 16 is adapted to be supported upon the surface heating unit 10 and comprises a hollow handle 19 housing a thermostatically controlled electric switch 20 and a socket 21, the switch 20 being electrically connected to the socket 21, and the socket 21 being adapted to receive a removable plug 22 carried on the adjacent end of the cable 17. The other end of the cable 17 carries a plug 23 adapted to be removably connected into the receptacle 18 that is carried on the front of the backsplasher 11 and thence into the control circuit between the push-button switch 12 and the surface heating unit 10 in the manner diagrammatically illustrated in Fig. 1. Thus it will be understood that the flexible cable 17 permits ready placement and removal of the cooking vessel 16 with respect to the surface heating unit 10.

Each of the push-button switches 12 etc., being of the type previously noted, comprises six individual push buttons, including high, second, third, low, warm and off push buttons, these push buttons being selectively operative to complete corresponding electrical heating connections between the source of current supply and the associated surface heating unit. Specifically, the push-button switch 12 comprises the relatively movable contact pairs 31, 32, 33, 34 and 35, and the associated interlock and transfer mechanism 37 operatively disposed between the contact pairs 31 to 35 inclusive, and the six individual push buttons noted. The interlock and transfer mechanism 37 is so constructed and arranged that when any one of the six push buttons noted is moved from its normal out position into its operated in position the contact pairs 31 to 35 inclusive, are selectively operated to make the corresponding heating connection between the source of current supply and the surface heating unit 10, and the previously operated one of the push buttons is returned from its operated in position back in its normal out position. Thus only one of the individual six push buttons may be operated at any time and the operated one of the push buttons effects the corresponding heating connection between the source of current supply and the surface heating unit 10, whereby heat is developed in the surface heating unit at the corresponding rate. The details of the construction and arrangement of the push-button switch 12 and the connections that may be completed by it between the source of current supply and the surface heating unit 10 are omitted in the interest of brevity as these items are disclosed in particularity in the Andrews patent mentioned. However, it will be observed that the outside conductor 14 is connected to one of the contacts 31; the outside conductor 15 is connected commonly to one of the contacts 34 and to one of the contacts 35; and the neutral conductor 13 is connected commonly to one of the contacts 32 and to one of the contacts 33. The surface heating unit 10 is of the two-section type, including the sections 41 and 42 arranged in series relation. One end of the section 41 is connected by a conductor 43 commonly to the other contact 33 and to the other contact 34; one end of the section 42 is connected by a conductor 44 to the other contact 35; and the junction between the sections 41 and 42 is connected by a conductor 45 commonly to the other contact 31 and to the other contact 32. Thus it will be understood that when the off push button of the push-button switch 12 occupies its operated position all of the contact pairs 31 to 35, inclusive, are in disengaged relation interrupting all of the electric circuits between the source of current supply and the surface heating unit 10. On the other hand, when various ones of the other five individual push buttons of the push-button switch 12 are selectively operated, various ones of the contact pairs 31 to 35 inclusive, are operated into engagement in order to complete various multiple and series heating connections between the sections 41 and 42 of the surface heating unit 10 and the 115 volts and the 230 volt terminals of the source of current supply, all as disclosed in the Andrews patent mentioned.

Each of the push-button switches 12, etc., further comprises, as illustrated in Fig. 2, the selective color illuminating arrangement for the individual push buttons thereof as disclosed in the Rees patent mentioned, and including the electric lamp 46. More particularly, the electric lamp 46 is illuminated when any one of the push buttons, other than the off push button, is moved into its operated position. At this time the light from the electric lamp 46 shines through an associated opening, not shown, provided in an associated color filter, not shown, and thence into the particular operated one of the push buttons; whereby the particular operated push button is illuminated or glows with an individual and corresponding color. Specifically, for reference purposes it is noted that the color filter arrangement respectively illuminates the high, second, third, low and warm push buttons in the respective colors red, yellow, purple, green and blue. Thus it will be understood that the operated position of a particular one of the individual five push buttons, other than the off push button, effects a color indication of the operated position thereof and thus of the switching position of the push-button switch 12, all as disclosed in the Rees patent mentioned.

The push-button switch 12 individually associated with the surface heating unit 10, with which the cooking vessel 16 is adapted to be associated, comprises additional structure, described more fully below, that is not incorporated in the other push-button switches carried by the backsplasher 11 and respectively associated with the other surface heating units of the electric range. Specifically, the unique push-button switch 12 illustrated is of the combination manually and automatically operated type and comprises the additional structure including the substantially L-shaped lever 51 that is operatively associated with the low push button and is further operatively associated with automatically controlled elements that are adapted to be governed by the thermal switch 20 incorporated in the cooking vessel 16 when the cooking vessel 16 is operatively associated with the surface heating unit 10, as explained more fully hereinafter. More specifically, a longitudinally extending supporting plate 52 is arranged within the backsplasher 11 and carries the individual push-button switches 12, etc., also housed within the backsplasher 11, so that the individual push buttons thereof project through appropriate openings provided in the front face 11a of the backsplasher 11 in order that they may be readily accessible from the exterior and the front of the backsplasher 11. Further, the supporting plate 52 carries a bracket 53 arranged adjacent to and below the unique push-button switch 12, the bracket 53 being provided with three rearwardly projecting tabs 54, 55 and 56. Specifically, the lever 51 is pivotally mounted upon a pivot pin 57 carried by the tab 54, the lever 51 being substantially L-shaped and including an upwardly directed arm 58 and a rearwardly directed arm 59. The upwardly directed arm 58 of the lever 51 projects through an opening 60 provided in the bottom of a ferrule 61 surrounding the rear end of the low push button in the push-button switch 12, as shown in Fig. 3; while the rearwardly directed arm 59 of the lever 51 cooperates with the automatically controlled elements previously noted.

Referring now more particularly to Figs. 4 to 7, inclusive, the automatically controlled mechanism 70 for selectively operating the lever 51 and consequently the low push button of the push-button switch 12 further comprises an element 71 that is slidably mounted upon an associated flat surface provided on the tab 55 carried by the bracket 53. Specifically, an elongated guide slot 72 is formed in the element 71; and the element 71 is mounted in an upstanding position upon the tab 55 by a screw 73 extending through the guide slot 72 and projecting through an opening provided in the tab 55, the rear end of the screw 73 carrying appropriate nuts 74 for the purpose of retaining it in place. The element 71 has a normal or down position and an operated or up position, respectively illustrated in Figs. 4 and 5, the element 71 being biased into its normal position by a coil spring 75. More particularly, the upper end of the coil spring 75 is hooked into an opening 76 provided in the lower end of the element 71, and the lower end of the coil spring 75 is hooked into an opening 77 provided in the tab 56. The upper end of the element 71 carries a pivotally mounted member 78 that is secured thereto by an arrangement including a screw 79 that is held in place by an associated nut 80. The member 78 is provided with oppositely directed arms 81 and 82, the arm 81 cooperating with the arm 59 of the lever 51 and comprising, in effect, a pawl as explained more fully hereinafter. The member 78 is normally biased in the clockwise direction, as viewed in Figs. 4 and 5, about the screw 79 by an arrangement including a coil spring 83 extending between the arm 82 and a tab 84 carried by the element 71, the opposite ends of the coil spring 83 being affixed into two openings respectively provided in the arm 82 and in the tab 84. The member 78 is normally retained in its position as illustrated in Figs. 4 and 5 by an associated stop 85 carried by the element 71.

For the purpose of moving the element 71 from its normal position, illustrated in Fig. 4, into its operated position, illustrated in Fig. 5, there is provided an electroresponsive motor or relay 90 that includes field structure 91, a movable armature 92 and an associated winding 93. The field structure 91 is suitably mounted upon the tab 56 by an arrangement including a plurality of screws 94 extending through associated rubber grommets 95 arranged in openings provided in the tab 56, the screws 94 carrying associated nuts 96. This arrangement, including the rubber grommets 95, effects the resilient mounting of the relay 90 upon the tab 56 and prevents the transmission of vibration from the relay 90 to the associated bracket 53 and consequently to the backsplasher 11 of the electric range. A rocking arm 97 is pivotally mounted intermediate its ends upon a screw 98 secured to the tab 55, one end of the rocking arm 97 being pivotally secured to the lower end of the element 71 by an arrangement including a screw 99, and the other end of the rocking arm 97 having an elongated slot 100 formed therein that receives a pivot pin 101 that is secured to a strap 102 carried by the armature 92 of the relay 90. The relay 90 is of a known construction and further includes structure 103 that cooperates with the strap 102 for the purpose of guiding the armature 92 in its movement between its attracted and released positions, the winding 93 surrounding the armature 92 and being disposed within the field structure 91.

In view of the foregoing description of the construction and arrangement of the mechanism 70 and the relay 90, it will be understood that when the winding 93 is energized the armature 92 is moved from its released position, illustrated in Fig. 4, downwardly into its attracted position, illustrated in Fig. 5, whereby the pivot pin 101 riding in the slot 100 provided in the adjacent end of the rocking arm 97 rotates the rocking arm 97 in the clockwise direction, as viewed in Figs. 4 and 5 about the screw 98 causing the screw 99 to move the element 71 from its normal position, illustrated in Fig. 4, upwardly into its operated position, illustrated in Fig. 5, against the bias of the coil spring 75. Subsequently when the winding 93 is de-energized the armature 92 is released to be returned from its attracted position upwardly back into its released position by the action of the coil spring 75. More particularly, the coil spring 75 having energy stored therein is contracted returning the element 71 from its operated position downwardly back into its normal position, whereby the rocking arm 97 is rotated in the counterclockwise direction, as viewed in Figs. 4 and 5 causing the armature 92 to be returned from its attracted position upwardly back into its released position, as previously noted.

Considering now the operation of the element 71 and the cooperation between the member 78 and the lever 51 in greater detail, it will be observed that the guide slot 72 formed in the element 71 has an offset provided therein between the ends thereof providing a curved guiding path for the element 71, so that as the element 71 is moved upwardly from its normal position, illustrated in Fig. 4, into its operated position, illustrated in Fig. 5, the element 71 is also moved toward the adjacent arm 59 of the lever 51; and, on the other hand, when the element 71 is moved downwardly from its operated position, illustrated in Fig. 5, back into its normal position, illustrated in Fig. 4, the element 71 is moved away from the adjacent arm 59 of the lever 51. More specifically, as the element 71 is moved upwardly and inwardly from its normal position, shown in Fig. 4, into its operated position, shown in Fig. 5, the pawl 81 of the member 78 rides over and above the arm 59 of the lever 51 and into engaging relationship therewith. Subsequently, when the element 71 is moved downwardly and outwardly from its operated position, shown in Fig. 5, into its normal position, shown in Fig. 4, the pawl 81 of the member 78 engaging the arm 59 of the lever 51 rotates the lever 51 in the clockwise direction, as viewed in Figs. 6 and 7, causing the arm 58 of the lever 51 arranged in the slot 60 formed in the ferrule 61 to move the ferrule 61 and consequently the low push button of the push-button switch 12 into its operated in position. Thus when the element 71 is moved from its operated position, shown in Fig. 5, back into its normal position, shown in Fig. 4, the low push button of the push-button switch 12 is moved into its operated in position, regardless of the previously operated push button of the push-button switch 12, whereby the push-button switch 12 is operated into its low switching position completing the corresponding low heating connection between the source of current supply and the surface heating unit 10 so that the heating of the surface unit 10 continues at the corresponding low heating rate.

Also, it will be appreciated that when the element 71 occupies its normal position, shown in Fig. 4, that the pawl 81 of the member 78 is disposed out of the path of movement or travel of the arm 59 of the lever 51 so that there is no interference by the pawl 81 with manual movement of the lever 51 as a consequence of manual operation of the low push button of the push-button switch 12. Further, when the element 71 occupies its operated position, shown in Fig. 5, there is no interference by the pawl 81 of the member 78 with manual movement of the lever 51 as a consequence of manual movement of the low push button of the push-button switch 12, since the pawl 81 of the member 78 occupies a position disposed over and above the arm 59 of the lever 51. Thus the pawl 81 of the member 78 never interferes with the manual movement of the arm 59 of the lever 51 as a consequence of manual operation of the low push button of the push-button switch 12 so that all of the push buttons of the push-button switch 12 have the same feel and ease of operation. Of course, when the low push button of the push-button switch 12 is operated from its normal out position into its operated in position, the lever 51 is rotated in the clockwise direction, as viewed in Figs. 6 and 7; however, since the lever 51 is of light weight and there is no interference between the arm 59 of the lever 51 and the pawl 81 of the member 78, regardless of the position of the element 71, there is no noticeable loading of the low push button.

When the element 71 is moved from its normal position, shown in Fig. 4, into its operated position, shown in Fig. 5, the extreme outer end of the pawl 81 of the member 78 may engage the adjacent arm 59 of the lever 51 in riding thereover and thereabove, as previously explained; however, this action is of no material consequence in view of the fact that the member 78 is pivotally mounted upon the screw 79 so that the member 78 is capable of some rotation in the counterclockwise direction, as viewed in Figs. 4 and 5, in order that it may clear the adjacent arm 59 of the lever 51 and then ride thereover and thereabove, as previously explained. When the element 71 occupies its operated position, shown in Fig. 5, the member 78 is restrained in its normal position in the clockwise direction by virtue of the pull of the coil spring 83 upon the arm 82 of the member 78 and the cooperation between the arm 82 of the member 78 and the associated stop 85 carried by the element 71.

In view of the foregoing description of the mechanism 70 and the associated electromagnetic relay 90, it will be readily appreciated that when the winding 93 of the relay 90 is de-energized the armature 92 is moved into its released position and the element 71 is moved into its normal position by the coil spring 75, as shown in Fig. 4; and at this time the manual operation of the various push buttons, including the low push button, of the push-button switch 12 may be carried out without any interference between the lever 51 moving with the low push button and the member 78 carried by the element 71. On the other hand, when the winding 93 of the relay 90 is energized, the armature 92 is moved into its attracted position and the element 71 is moved into its operated position against the bias of the coil spring 75, as shown in Fig. 5; and at this time the manual operation of the various push buttons, including the low push button, of the push-button switch 12 may be carried out without any interference between the lever 51 moving with the lower push button and the member 78 carried by the element 71.

Considering now the over-all operation of the electric range, and again referring to Fig. 1, the cook places the food that is to be cooked into the vessel 16, places the vessel 16 in supported relation upon the surface heating unit 10, and then connects the thermal switch 20 into the control circuit of the push-button switch 12 by plugging the cable 17 between the outer end of the handle 19 carried by the vessel 16 and the receptacle 18 carried upon the front face of the backsplasher 11. At this time the high push button of the push-button switch 12 is manually moved from its normal out position into its operated in position, whereby there is completed the high electrical heating connection between the source of current supply and the surface heating unit 10. More specifically, the sections 41 and 42 of the surface heating unit 10 are connected in multiple across the outside lines 14 and 15 of the source of current supply causing the 230 volts A. C. to be connected across each of the sections 41 and 42 of the surface heating unit 10. This circuit may be traced from the outside conductor 14 via the engaged contacts 31 and the conductor 45 to the junction between the sections 41 and 42 of the surface heating unit 10, and from the outside conductor 15 via the engaged contacts 34 and 35 to the respective conductors 43 and 44, and then to the outside terminals of the respective sections 41 and 42 of the surface heating unit 10. Accordingly, at this time heating of the surface heating unit 10 at the high heating rate is initiated so that the food contained in the vessel 16 is brought to a cooking condition in a very short interval of time. Also, the operation of the high push button of the push-button switch 12 completes a circuit for energizing the winding 93 of the relay 90; which circuit extends from the neutral conductor 13 via the winding 93 to the conductor 43 and thence via the engaged contacts 34 to the outside conductor 14. Also, included in this circuit is the thermostatic switch 20 and the cable 17, whereby the winding 93 of the relay 90 is retained in its energized position by the normally closed contacts of the thermostatic switch 20. When the winding 93 is thus energized the armature 92 is moved into its attracted position effecting movement of the element 71 of the mechanism 70 into its operated position so that the pawl 81 of the member 78 is disposed over and above the arm 59 of the lever 51 that is operatively connected to the low push button of the push-button switch 12.

As the food contained in the vessel 16 is heated at the high heating rate as explained above the thermostatic switch 20 is also heated and operates into its open circuit position when the vessel 16 and its contents have been heated from the ambient temperature to the previously mentioned cooking condition. The cooking condition mentioned normally comprises the temperature at which ordinary foods begin to boil, which temperature would normally be somewhat in excess of 212 degrees F.; and the exact temperature at which the thermostatic switch 20 is operated from its closed position into its open position may be selectively adjusted in any suitable manner, such as by a manually settable knob 24. When the thermostatic switch 20 is thus operated into its open position, the circuit for retaining energized the winding 93 of the relay 90 is interrupted, whereby the coil spring 75 returns the armature 92 to its released position and the element 71 into its normal position. As the element 71 is returned into its normal position the member 78 carried thereby operates the lever 51 moving the low push button of the push-button switch 12 from its normal out position into its operated in position as previously explained. Accordingly, at this time the low push button of the push-button switch 12 occupies its operated in position, whereby the push-button switch 12 completes the low heating connection between the surface heating unit 10 and the source of current supply. Specifically, the section 42 of the surface heating unit 10 is connected across the 115 volts terminals of the source of current supply, and the section 41 of the surface heating unit 10 is disconnected from the source of current supply. The circuit noted may be traced from the neutral conductor 13 via the engaged contacts 32, the conductor 45, the section 42 of the surface heating unit 10, the conductor 44, and the engaged contacts 35 to the outside conductor 15. Thus at this time heating of the vessel 16 and its contents are continued at the low heating rate. Of course, it will be understood that the arrangement above-described permits heating of the cooking vessel 16 at the high heating rate until the predetermined cooking condition therein is reached, whereupon continued heating of the cooking vessel 16 is carried out at the low heating rate in order to prevent undue and unnecessary boiling at a high rate of the food contained in the cooking vessel 16.

After the food contained in the cooking vessel 16 has been cooked for an appropriate time interval, the cook manually moves the off push button from its out position into its in position, whereby the low electrical heating connection between the surface heating unit 10 and the source of current supply is interrupted in order to arrest further heating of the surface heating unit 10 and the consequent cooking of the food contained in the cooking vessel 16.

Of course, it will be understood that the surface heating unit 10 may be operated and employed in a conventional manner under the control of the push-button switch 12, just as any other of the surface heating units incorporated in the electric range, when the cable 17 is detached from between the end of the handle 19 and the receptacle 18 carried on the front of the backsplasher 11. In other words, when the cable 17 is not employed to connect the thermal switch 20 into the control circuit of the surface heating unit 10, the surface heating unit 10 may be manually controlled by the push-button switch 12 in an entirely conventional manner. Of course, it will be understood that the particular operated position of the push-button switch 12, whether it is under manual control or under combination manual and automatic control, as explained above, is selectively indicated by the selective color control arrangement, since this feature as disclosed in the Rees patent mentioned is directly incorporated in the push-button switch 12, as previously noted.

In view of the foregoing it is apparent that there has been provided in an electric cooking appliance, such as an electric range, an improved circuit control arrangement for effecting selective heating of a heating unit of the appliance in accordance with a cooking condition produced by the heating unit in an associated cooking vessel. Moreover, this arrangement utilizes improved and simplified switching apparatus comprising a single push-button switch that is jointly controlled manually and by an associated electroresponsive motor so that the heating rate of the heating unit is governed entirely by the switching operations of the push-button switch, and wherein there is no interference between the manually operated elements and the automatically operated elements of the switching apparatus so that the individual push buttons of the push-button switch have the same feel and ease of operation.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Switching apparatus comprising mechanism selectively operative into a plurality of different switching positions, manually operable means for selectively operating said mechanism into its different switching positions, a pivotally mounted lever operatively connected to said mechanism and movable between a normal position and an operated position, said lever being moved from its normal position into its operated position in response to operation of said mechanism into a predetermined one of its switching positions and being moved from its operated position into its normal position in response to operation of said mechanism into any other of its switching positions, movement of said lever from its normal position into its operated position operating said mechanism into said predetermined one of its switching positions from any other of its switching positions, an element mounted for movements between a normal position and an operated position, a spring biasing said element into its normal position, means for moving said element against the bias of said spring from its normal position into its operated position and for selectively restraining and releasing said element in its operated position, said spring moving said element from its operated position back into its normal position in response to the release of said element, a member mounted on said element and cooperating with said lever, said member being moved into engaging relation with said lever in its normal position in response to movement of said element from its normal position into its operated position, said member engaging and moving said lever from its normal position into its operated position in response to movement of said element from its operated position into its normal position, and means for moving said member into disengaging relation with said lever in response to movement of said element into its normal position, said lever being readily movable between its normal position and its operated position in response to selective operations of said mechanism without interference with said member regardless of the position of said element.

2. Switching apparatus comprising mechanism selectively operative into a plurality of different switching positions, manually operable means for selectively operating said mechanism into its different switching positions, a pivotally mounted lever operatively connected to said mechanism and movable between a normal position and an operated position, said lever being moved from its normal position into its operated position in response to operation of said mechanism into a predetermined one of its switching positions and being moved from its operated position into its normal position in response to operation of said mechanism into any other of its switching positions, movement of said lever from its normal position into its operated position operating said mechanism into said predetermined one of its switching positions from any other of its switching positions, a support, an element mounted for sliding movements upon said support along a given path between a normal position and an operated position, said path extending in a longitudinal direction between said normal and operated positions of said element and including a lateral offset adjacent to said normal position of said element, a spring biasing said element into its normal position, means for moving said element along said path against the bias of said spring from its normal position into its operated position and for selectively restraining and releasing said element in its operated position, said spring moving said element along said path from its operated position back into its normal position in response to the release of said element, and a member pivotally mounted on said element and cooperating with said lever, said member being pivoted on said element over and into engaging relation with said lever in its normal position in response to movement of said element along said path from its normal position into its operated position, said member engaging and moving said lever from its normal position into its operated position in response to movement of said element along said path from its operated position into its normal position, said member being moved with said element from over and into disengaging relation with said lever in response to movement of said element in said lateral offset along said path into its normal position, said lever being readily movable between its normal position and its operated position in response to selective operations of said mechanism without interference with said member regardless of the position of said element.

3. Switching apparatus comprising mechanism selectively operative into a plurality of different switching positions, manually operable means for selectively operating said mechanism into its different switching positions, a pivotally mounted lever operatively connected to said mechanism and movable between a normal position and an operated position, said lever being moved from its normal position into its operated position in response to operation of said mechanism into a predetermined one of its switching positions and being moved from its operated position into its normal position in response to operation of said mechanism into any other of its switching positions, movement of said lever from its normal position into its operated position operating said mechanism into said predetermined one of its switching positions from any other of its switching positions, an element mounted for movements between a normal position and an operated position, an electromagnetic relay provided with an armature movable between a released position and an attracted position, an operative connection between said element and said armature, a spring operatively connected to said element and to said armature and biasing said element into its normal position and biasing said armature into its released position, said element being moved from its normal position into its operated position and energy being stored in said spring and said armature being moved from its released position into its attracted position in response to energization of said relay, said spring moving said element from its operated position back into its normal position and moving said armature from its attracted position back into its released position in response to de-energization of said relay, and a member mounted on said element and cooperating with said lever, said member being moved behind and into engaging relation with said lever in its normal position in response to movement of said element from its normal position into its operated position, said member engaging and moving said lever from its normal position into its operated position in response to movement of said element from its operated position into its normal position, said member being moved from behind and into disengaging relation with said lever in response to movement of said element into its normal position, said lever being readily movable between its normal position and its operated position in response to selective operations of said mechanism without interference with said member regardless of the position of said element.

4. Switching apparatus comprising mechanism selectively operative into a plurality of different switching positions, a plurality of manually operable push buttons respectively corresponding to the different switching positions of said mechanism, each of said push buttons having a normal out position and an operated in position, means responsive to operation of any one of said push buttons from its out position into its in position for operating said mechanism into the corresponding one of its switching positions and for returning the previously operated one of said push buttons from its in position into its out position, a pivotally mounted lever operatively connected to a predetermined one of said push buttons and movable between a normal position and an operated position, said lever being moved from its normal position into its operated position in response to operation of said one push button from its out position into its in position and being moved from its operated position into its normal position in response to the return to said one push button from its in position into its out position, movement of said lever from its normal position into its operated position operating said one push button from its out position into its in position, an element mounted for movements between a normal position and an operated position, a spring biasing said element into its normal position, means for moving said element against the bias of said spring from its normal position into its operated position and for selectively restraining and releasing said element in its operated position, said spring moving said element from its operated position back into its normal position in response to the release of said element, a member mounted on said element and cooperating with said lever, said member being moved behind and into engaging relation with said lever in its normal position in response to movement of said element from its normal position into its operated position, said member engaging and moving said lever from its normal position into its operated position in response to movement of said element from its operated position into its normal position, and means for moving said member from behind and into disengaging relation with said lever in response to movement of said element into its normal position, said lever being readily movable between its normal and operated positions in response to movements of said one push button between its in and out positions without interference with said member regardless of the position of said element.

5. Switching apparatus comprising mechanism selectively operative into a plurality of different switching positions, manually operable means for selectively operating said mechanism into its different switching positions, a pivotally mounted lever operatively connected to said mechanism and movable between a normal position and an operated position, said lever being moved from its normal position into its operated position in response to operation of said mechanism into a predetermined one of its switching positions and being moved from its operated position into its normal position in response to operation of said mechanism into any other of its switching positions, movement of said lever from its normal position into its operated position operating said mechanism into said predetermined one of its switching positions from any other of its switching positions, an element mounted for movements between a normal position and an operated position, motor means for selectively moving said element between its normal position and its operated position, and means including a one-way connection between said element and said lever for effecting movement of said lever from its normal position into its operated position in response to movement of said element from its operated position into its normal position without effecting movement of said lever regardless of the position thereof in response to movement of said element from its normal position into its operated position, said one-way connection permitting ready movement of said lever between its normal position and its operated position in response to selective operations of said mechanism without interference with said element regardless of the position of said element.

ROLAND O. WARNER.

REFERENCES CITED

The following references are of record in the file of this patent:

UNITED STATES PATENTS

| Number | Name | Date |
|---|---|---|
| 2,263,420 | Hammell | Nov. 18, 1941 |
| 2,416,897 | Brady et al. | Mar. 4, 1947 |
| 2,431,904 | Andrews | Dec. 2, 1947 |
| 2,507,920 | McCormick | May 16, 1950 |
| 2,550,579 | McDowell | Apr. 24, 1951 |